UNITED STATES PATENT OFFICE.

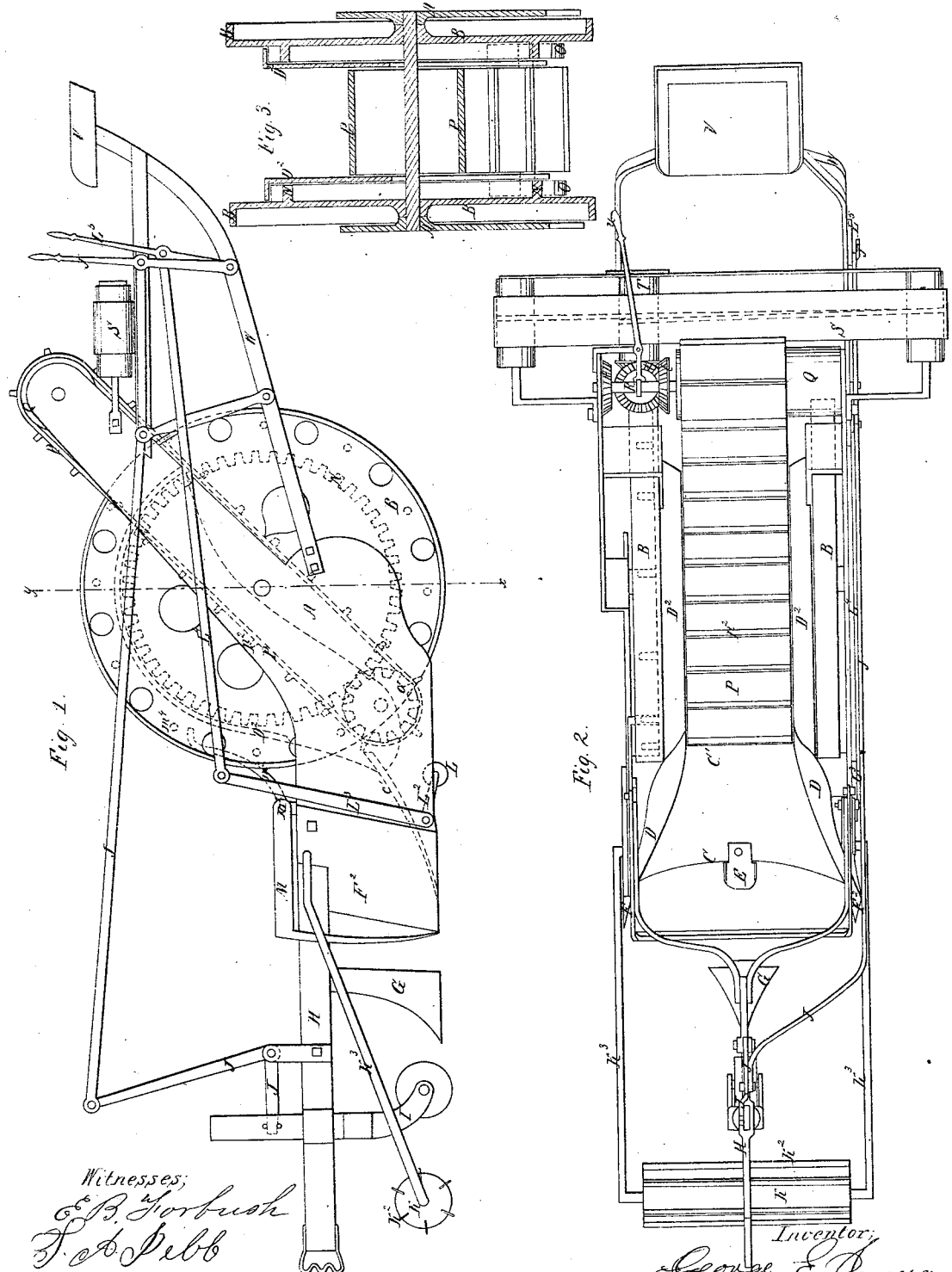

GEO. E. INMAN, OF BUFFALO, NEW YORK.

DITCHING-MACHINE.

Specification of Letters Patent No. 26,189, dated November 22, 1859.

*To all whom it may concern:*

Be it known that I, GEORGE E. INMAN, of the city of Buffalo, county of Erie, and State of New York, have invented certain new and useful Improvements in Ditching-Machines; and I do hereby declare that the following is a full, clear, and exact description of the construction and operation of the same, reference being had to the annexed drawings, making a part of this specification, in which—

Figure I is a side elevation. Fig. II is a plan. Fig. III is a transverse section on line $x$—$y$.

Letters of like name and kind refer to like parts in each of the figures.

(A) represents the main supporting frame of the machine; (B and B) two driving wheels running upon the same shaft and placed so near together as to track within the ditch to be dug; (C) horizontal plow shares with an inclination upward as at $C'$ to elevate the dirt to the conveyer; (D) side pieces connected with the plow share and leading to the conveyer. To these side pieces, straight colters may be attached as shown at (F), or inclined colters as shown at ($F^2$) for cutting ditches with straight sides or sloping sides as required.

$D^2$ are side pieces connected with share (C) and side pieces (D), inclining upward between the driving wheels; so as to keep the dirt upon the conveyer; (E) secondary or tile share, made rounding which may be connected to the horizontal share for the purpose of cutting a smaller ditch on the bottom of the main ditch for laying drain tile therein; (F) upright colter for cutting the perpendicular side of the ditch and made separate from the side prices. At ($F^2$) is shown another form of colter for cutting sloping sides; (G) plow placed in front of the main plow share (C) and supported from the draft beam (H); (I) caster wheel connected with the draft beam, and running forward of the plows for the purpose of graduating the depth which the plows shall cut. This can be done by the driver while on his seat by means of the series of jointed levers (J, J, J, J).

(K) represents a roller which rolls on the ground forward of the caster wheel. It is furnished with cutters ($K^2$) lying lengthwise of the rollers for the purpose of cutting the sod and earth forward of the plows. It is hinged to the main frame by means of the arms ($K^3$).

(L) shows a roller placed under the elevated part of the plow (C). It is adjusted at pleasure by means of the series of jointed levers ($L^2$ $L^3$ $L^4$ $L^5$) and in connection with the caster wheel will support the weight of the forward part of the machine instead of allowing it to rest upon the plows.

M is a cutter hinged to the main frame at $m^2$ with a crooked arm ($m^3$) which is acted upon by pins ($m^4$) projecting from the driving wheel. These pins will strike the arm and bear it down and thereby raise the cutter when the pins pass off from the arm the cutter will by its own weight drop down and cut or chop up the earth in front of the plow share (C), and by means of this cutter and the roller and cutters (K $K^2$) and the middle plow (G) the earth becomes loosened and pulverized before it is taken up by the share (C) and carried onto the conveyer.

The dotted lines (N) show the gear on the main driving wheels; and ($o$) the driving pinions.

The conveyer, P is made of an endless belt of leather with cross slats ($P^2$) of wood, for holding, or preventing the earth from slipping down on the belt. It passes around the pinion shaft ($O'$) (enlarged by a drum) and around the drum (Q) on shaft (R). This conveyer runs close to the elevated part of the share ($C'$) and takes the earth therefrom and carries it up and empties it upon the cross conveyer (S).

The drum Q is driven by means of the conveyer or belt (P) and the cross conveyer (S) is driven by means of the arrangement of the gear ($t$ $t$ $t$ $t$) and drum T. By means of the arrangement of the said gear with the lever (U) the gear may be varied so as to run the cross conveyer in either direction and thereby deposit the earth on either side of the ditch as desired.

This machine may be used to a great advantage for ditching and making earth fence and for excavating for railroad purposes &c.

(V) is the driver's seat; (W) arms attached to main frame for supporting driver's seat, and levers.

When turning around the forward part of the machine may be caused to rest entirely upon the caster wheel, and thereby cause it to turn easily. And when moving the machine when not at work the caster wheel and roller (L) may be lowered so that the whole machine will rest upon these and the driving wheels by which means it may be moved from place to place with great convenience.

By placing the driving wheels upon the same shaft and close together so that they will track in the ditch, I am enabled to make the ditch irrespective of the unlevel surface of the ground.

Claim:

1. I claim the cutter (M) arranged and operating substantially as set forth.

2. I claim the arrangement of the adjustable roller (L) under the elevated part of the share C substantially as set forth.

3. I claim the arrangement of the caster wheel (I) plow (G) cutter M adjustable roller (L) and plow share (C, C',) and side pieces (D), relatively to each other substantially as described.

4. I claim the arrangement of the two driving wheels B, B, on the same shaft when placed so near together as to track within the ditch cut by the horizontal share C, substantially as described.

GEORGE E. INMAN.

Witnesses:
E. B. FORBUSH,
T. A. JEBB.